Feb. 25, 1936.   P. N. CHIASSON   2,032,261
COMBINED FELLY, RIM, AND TIRE STRUCTURE
Filed Sept. 30, 1935
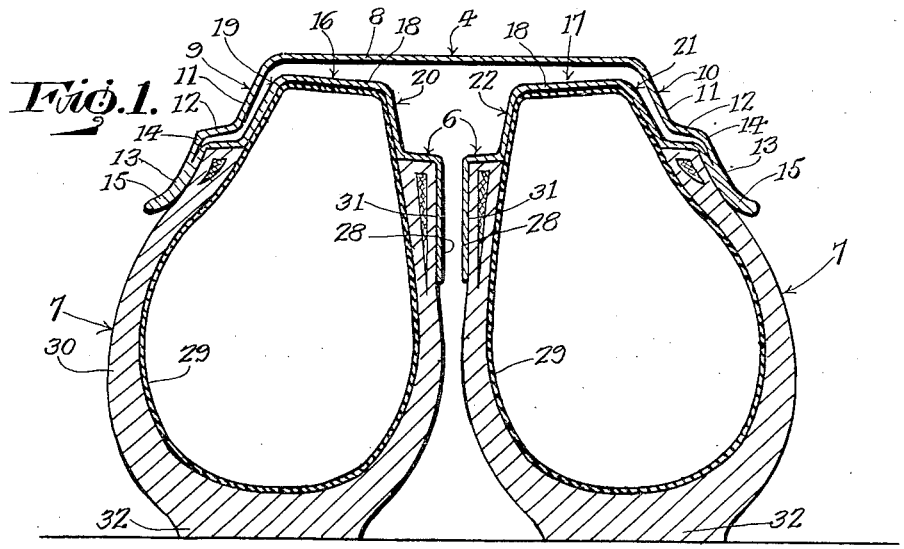
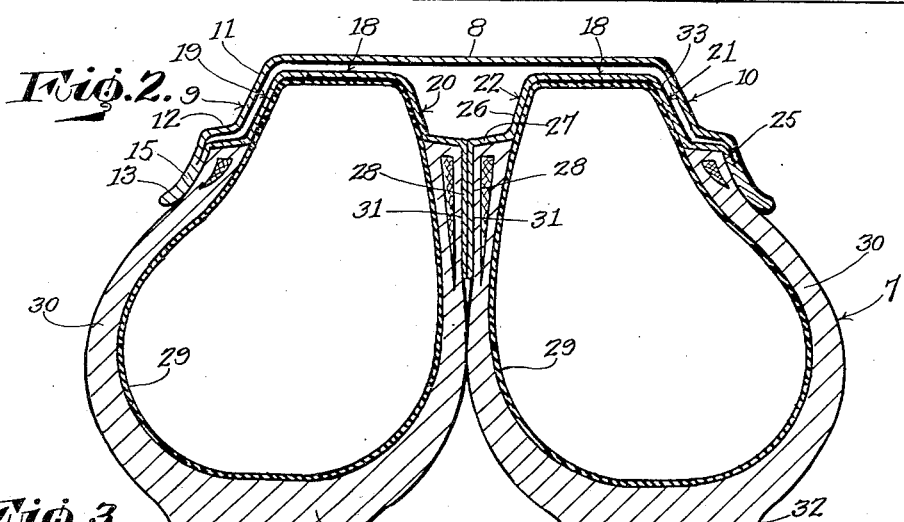
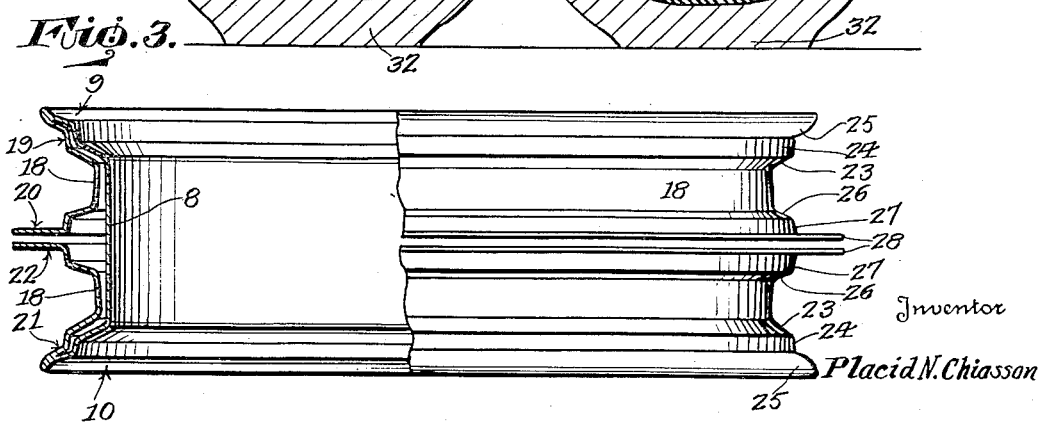
Inventor
Placid N. Chiasson
By Geo. P. Kimmel
Attorney Patented Feb. 25, 1936

2,032,261

UNITED STATES PATENT OFFICE 2,032,261

COMBINED FELLY, RIM, AND TIRE STRUCTURE

Placid N. Chiasson, Griggsville, Ill.

Application September 30, 1935, Serial No. 42,913

11 Claims. (Cl. 152—22)

This invention relates to a combined felly, rim and tire structure designed primarily for use in connection with the wheels of automotive vehicles, but it is to be understood that a structure, in accordance with this invention, is to be used in any connection for which it may be found applicable, and the object of the invention is to provide, in a manner as hereinafter set forth, a structure of the class referred to including a pair of sidewise opposed pneumatic tire elements arranged in a manner relative to each other to make the structure readily adaptable for the front and rear wheels of the vehicle.

A further object of the invention is to provide, in a manner as hereinafter set forth, a structure of the class referred to including a pair of independent pneumatic tire elements for traction purposes and with said elements connected with a felly common thereto. The said elements are so arranged relative to each other to provide, if one becomes impaired while the vehicle is in motion, for the other to perform its traction function thereby reducing accidents to a minimum and with the non-impaired element being the equivalent of a spare tire.

A further object of the invention is to provide, in a manner as hereinafter set forth, a structure of the class referred to including a pair of independent sidewise opposed pneumatic tire elements for a wheel acting to reduce skidding at sharp corners and on slippery pavements, and whereby when each of the front and each of the rear wheels of the vehicle is equipped with a combination structure, in accordance with this invention, eight pneumatic tire elements will support the vehicle instead of the usual four, resulting in a reduction of air pressure and, therefore, less danger of blowouts.

A further object of the invention is to provide, in a manner as hereinafter set forth, a structure of the class referred to including a felly carrying a tire rim formed of a pair of flexible sections, each carrying an independent pneumatic tire element and whereby the tire sections will allow for the opposed sides of the tire elements to be displaced, by the weight of the vehicle, in a horizontal direction towards the vertical center of and in a vertical direction towards the felly, thereby shortening the vertical diameter and broadening the horizontal. This flexible mounting of the tread elements will allow for greater riding comfort and minimize the danger of injury to the tires.

A further object of the invention is to provide, in a manner as hereinafter set forth, a structure of the class referred to including a pair of sidewise opposed, flexibly supported tire elements which require a less amount of air pressure for inflation whereby the danger of accidents will be minimized resulting in the protection of life and property.

Further objects of the invention are to provide, in a manner as hereinafter set forth, a structure of the class referred to which is simple in its construction and arrangement, strong, durable, compact, thoroughly efficient in its use and comparatively inexpensive to manufacture.

To the above ends essentially and to others which may hereinafter appear, the invention consists of the novel construction, combination and arrangement of parts as will be more specifically described and as are illustrated in the accompanying drawing wherein is shown an embodiment of the invention, but it is to be understood that changes, variations and modifications may be resorted to which fall within the scope of the invention as claimed.

In the drawing:

Figure 1 is a cross sectional view of the combined felly, rim and tire structure free of the application of weight to laterally distend in opposite directions a pair of opposed pneumatic tire elements forming parts of the structure, Figure 2 is a view similar to Figure 1, as the structure would, upon the application of weight thereto, laterally distend the tire elements for opposed side abutment and to move said elements toward the felly whereby the horizontal diameter of the structure is increased and the vertical diameter of the structure reduced, and Figure 3 is a fragmentary view in top plan of the structure with the tire elements removed.

The structure, generally indicated at 4, includes a felly 5, a rim 6 and a pair of oppositely disposed pneumatic tire elements 7.

The felly 4 includes an annulus 8 of the desired diameter having directed outwardly from its sides a pair of oppositely disposed outwardly inclined annular flanges 9, 10. Each flange, in cross section, (with reference to Figures 1 and 2) includes an outwardly inclined inner stretch 11, an intermediate stretch 12 extending outwardly at right angles to the outer end of stretch 11 and an outwardly inclined outwardly curved outer stretch 13. The inner end of stretch 12 merges into the outer end of stretch 11. The stretch 13 is formed with an inner and an outer part 14, 15 respectively. The part 14 is of reduced thickness and length with respect to the part 15. The outer face of part 14 is flush with the outer face of part 15 whereby the latter is inset with respect to the inner face of the former. The stretch 12 merges at its outer end into the inner end of the part 14 of stretch 13. The stretch 12 extends at an upward inclination from the stretch 11 to the stretch 13.

The rim 6 is formed of a pair of normally spaced oppositely disposed opposed flexible or resilient sections 16, 17 of like form extending towards each other. The sections 16, 17 normally extend towards the vertical center of the annulus 8 at opposite downward inclinations and are capable of abutting each other at their opposed sides when weight is applied to the structure. Such position is shown in Figure 2. The normal position of the rim sections is shown in Figure 1.

The rim sections 16, 17 are of like form and each includes an annulus 18 of materially less width and of greater diameter than that of annulus 8. The annuli 18 of sections 16, 17 encompass the annulus 8 permanently in spaced relation and inwardly adjacent to flanges 9, 10.

The annulus 18 of the section 16 is formed at its sides with oppositely disposed outwardly inclined annular outer and inner flanges 19, 20 respectively. The annulus 18 of section 17 is formed at its sides with oppositely disposed outwardly inclined annular outer and inner flanges 21 and 22 respectively. The flanges 19, 21 are of the same form. The flanges 20, 22 are of the same form. In vertical cross section at any point throughout, the flanges 19, 21 are of greater length than flanges 20, 22. The flanges 19, 21, in vertical cross section, (with reference to Figures 1 and 2) include an outwardly inclined inner stretch 23, an intermediate stretch 24 extending outwardly at right angles to the outer end of stretch 23 and an outwardly inclined outer stretch 25 of less length than that of stretches 23, 24. The stretch 24 is of less length than and merges at its inner end into the outer end of stretch 23. The outer end of stretch 24 merges into the inner end of stretch 25. The stretch 24 inclines at a slight downward inclination from stretch 23 to stretch 24. The flanges 20, 22, in vertical cross section, (with reference to Figures 1 and 2) include an outwardly inclined inner stretch 26, an intermediate stretch 27 extending outwardly at right angles to the outer end of stretch 26 and an outer stretch 28 of greater length than the stretch 26, 27. The stretch 28 depends at right angles to the outer end of stretch 27. The stretch 27 is of less length than stretch 26 and extends downwardly at a slight inclination from stretch 26 to stretch 28. The stretches 28 oppose each other when weight is not applied to the structure and will appear as shown in Figure 1. When weight is applied to the structures the stretches 28 will be brought into abutting engagement throughout and will assume the position shown in Figure 2.

The flanges 9, 10 encompass the stretches 23, 24 of the flanges 19, 21 permanently in spaced relation. The stretches 25 of the flanges 19, 21 merge into the inner end of the enlarged parts 15 of the flanges 9, 10 respectively whereby the sections 16, 17 of the rim 6 are flexibly connected to the felly 4.

The tire elements 7 are of like form and each consists of an inflatable inner tube 29 which extends into a rim section and, when inflated, bears against the annulus 18 and the stretches 23 and 24 of the flanges of such section. When tube 29 is inflated it extends beyond the outer ends of stretches 23, 24 and also beyond the outer ends of the flanges of the felly. The tube 29 is partly encased by an outer shoe 30 formed with a straight inner side portion 31 and an offset tread portion 32. The inner side edge of shoe 30 abuts against a stretch 24 and the outer side edge abuts against a stretch 27. The straight inner side portion 31 of the shoe abuts a stretch 28. The marginal portion of the outer face of the shoe bordering its outer side edge abuts the wide part 15 of the stretch 13 of a felly flange and the stretch 25 of a rim flange. The tube 29 extends inwardly from the open inner end of the shoe to engage an annulus of a rim section.

The stretches 28, when weight is not applied to the tire elements to extend them, maintain the shoes in opposed spaced relation, as shown in Figure 1. When weight is applied to the tire elements to laterally extend them, the stretches 28 prevent the abutting of the straight inner side portions 31 of the shoes 30 but do not prevent the inner sides of the shoes from abutting at a point outwardly adjacent the lower ends of said stretch 28, as shown in Figure 2. The flanges 20, 22 are of materially greater length in vertical section, at any point thereof, than that of the flanges 19, 22. The angle-shaped contour of the felly flanges provide clearance for the outer angle-shaped flanges of the rim sections.

What I claim is:

1. A combined felly, rim and tire structure for a vehicle wheel comprising a felly formed of an annulus having each of its sides provided with an outwardly directed flange, a rim formed of a pair of independent flexible sections normally spaced from each other and permanently spaced from said annulus, each of said sections being formed with an inner and an outer outwardly extending flange encompassed by the flanges of the felly, said outer flanges merging at their outer ends into the sides of the felly flanges in proximity to the outer ends of the latter, a pair of inflatable tubes, each having its inner portion arranged in a rim section, and a pair of tread shoes open at their inner ends, each shoe encompassing that portion of a tube extended from a rim section, having its edges abutting parts of the flanges of a rim section, having the inner portion of its outer side encompassed by a part of a felly flange, and the inner portion of its outer side encompassed by another part of the inner flange of a rim section.

2. A combined felly, rim and tire structure for a vehicle wheel comprising a felly formed of an annulus having each of its sides provided with an outwardly directed flange, a rim formed of a pair of independent flexible sections normally spaced from each other and permanently spaced from said annulus, each of said sections being formed with an inner and an outer outwardly extending flange encompassed by the flanges of the felly, said outer flanges merging at their outer ends into the sides of the felly flanges in proximity to the outer ends of the latter, a pair of inflatable tubes, each having its inner portion arranged in a rim section, and a pair of tread shoes open at their inner ends, each shoe encompassing that portion of a tube extended from a rim section, having its edges abutting parts of the flanges of a rim section, having the inner portion of its outer side encompassed by a part of a felly flange, the inner portion of its outer side encompassed by another part of the inner flange of a rim section, and the inner portion of the inner side of the shoe and that part of the inner flange of a rim section encompassing said inner portion being straight.

3. A combined felly, rim and tire structure for a vehicle wheel comprising a felly formed of an annulus having each of its sides provided with an outwardly directed flange, a rim formed of a pair of independent flexible sections normally spaced from each other and permanently spaced from said annulus, each of said sections being formed with an inner and an outer outwardly extending flange encompassed by the flanges of the felly, said outer flanges merging at their outer ends into the sides of the felly flanges in proximity to the outer ends of the latter, a pair of inflatable tubes, each having its inner portion arranged in a rim section, and a pair of tread shoes open at their inner ends, each shoe encompassing that portion of a tube extended from a rim section, having its edges abutting parts of the flanges of a rim section, having the inner portion of its outer side encompassed by a part of a felly flange, the inner portion of its outer side encompassed by another part of the inner flange of a rim section, and that part of the inner flange of a rim section encompassing the inner portion of the inner side of the shoe being of greater length, at any point thereof in vertical section, than the length of a felly flange at any point in vertical section.

4. A combined felly, rim and tire structure for a vehicle wheel comprising a felly formed of an annulus having each of its sides provided with an outwardly directed flange, a rim formed of a pair of independent flexible sections normally spaced from each other and permanently spaced from said annulus, each of said sections being formed with an inner and an outer outwardly extending flange encompassed by the flanges of the felly, said outer flanges merging at their outer ends into the sides of the felly flanges in proximity to the outer ends of the latter, a pair of inflatable tubes, each having its inner portion arranged in a rim section, and a pair of tread shoes open at their inner ends, each shoe encompassing that portion of a tube extended from a rim section, having its edges abutting parts of the flanges of a rim section, having the inner portion of its outer side encompassed by a part of a felly flange, the inner portion of its outer side encompassed by another part of the inner flange of a rim section, that part of the inner flange of a rim section encompassing the inner portion of the inner side of the shoe being of greater length, at any point thereof in vertical section, than the length of a felly flange at any point in vertical section, and the inner portion of the inner side of the shoe and that part of the inner flange of a rear section encompassing said inner portion being straight.

5. In a combined felly, rim and tire structure for a vehicle wheel, a felly having oppositely extending flanges at its sides, a rim formed of a pair of flexible sections encompassing, in spaced relation, said rim and each section having oppositely extending flanges at its sides, said sections being encompassed in spaced relation by said felly flanges, the outer flanges of said rim sections merging into the felly flanges adjacent the outer ends of the latter, independent inflatable tubes extending into said rim sections and confined in said sections by parts of the flanges of the latter, a pair of shoes, each including a tread surface, and said shoes encompassing said tubes and retained in position by the flanges of the rim and the inner flanges of said rim sections.

6. In a combined felly, rim and tire structure for a vehicle wheel, a felly having oppositely extending flanges at its sides, a rim formed of a pair of flexible sections encompassing, in spaced relation, said rim and each section having oppositely extending flanges at its sides, said sections being encompassed in spaced relation by said felly flanges, the outer flanges of said rim sections merging into the felly flanges adjacent the outer ends of the latter, independent inflatable tubes extending into said rim sections and confined in said sections by parts of the flanges of the latter, a pair of shoes, each including a tread surface, said shoes encompassing said tubes and retained in position by the flanges of the rim and the inner flanges of said rim sections, and each of the flanges of said felly and each of the flanges of each rim section including a series of parts arranged in angular relation.

7. In a combined felly, rim and tire structure for a vehicle wheel, a felly having oppositely extending flanges at its sides, a rim formed of a pair of flexible sections encompassing in spaced relation said rim and each section having oppositely extending flanges at its sides, said sections being encompassed in spaced relation by said felly flanges, the outer flanges of said rim sections merging into the felly flanges adjacent the outer ends of the latter, independent inflatable tubes extending into said rim sections and confined in said sections by parts of the flanges of the latter, a pair of shoes, each including a tread surface, said shoes encompassing said tubes and retained in position by the flanges of the rim and the inner flanges of said rim sections, and the inner flanges of said rim sections in vertical section being of greater length than the felly flanges in vertical section.

8. In a combined felly, rim and tire structure for a vehicle wheel, a felly having oppositely extending flanges at its sides, a rim formed of a pair of flexible sections encompassing in spaced relation said rim and each section having oppositely extending flanges at its sides, said sections being encompassed in spaced relation by said felly flanges, the outer flanges of said rim sections merging into the felly flanges adjacent the outer ends of the latter, independent inflatable tubes extending into said rim sections and confined in said sections by parts of the flanges of the latter, a pair of shoes, each including a tread surface, said shoes encompassing said tubes and retained in position by the flanges of the rim and the inner flanges of said rim sections, the inner flanges of said rim sections in vertical section being of greater length than the felly flanges in vertical section, and each of said flanges of said felly and each of the flanges of each rim section including a series of parts arranged in angular relation.

9. A combined felly, rim and tire structure for a vehicle wheel comprising a felly in the form of an annulus having each of its sides provided with outwardly directed flanges, a rim formed of a pair of oppositely disposed flexible tire elements receiving sections normally spaced from each other and permanently spaced from said annulus, each of said sections formed with an outer and an inner outwardly directed flange, the outer flange of each rim section merging into and encompassed by a flange of the felly, and a tire element mounted in and extended from each rim section.

10. A combined felly, rim and tire structure for a vehicle wheel comprising a felly in the form of an annulus having each of its sides provided with outwardly directed flanges, a rim formed of a pair of oppositely disposed flexible tire elements receiving sections normally spaced from each other and permanently spaced from said annulus, each of said sections formed with an outer and an inner outwardly directed flange, the outer flange of each rim section merging into and encompassed by a flange of the felly, and a tire element mounted in and extended from each rim section, said tire elements being encompassed by the flanges of the felly and the inner flanges of the rim sections, the said inner flanges being straight and extended beyond the flanges of the felly.

11. A combined felly, rim and tire structure for a vehicle wheel comprising a felly in the form of an annulus having each of its sides provided with outwardly directed flanges, a rim formed of a pair of oppositely disposed flexible tire elements receiving sections normally spaced from each other and permanently spaced from said annulus, each of said sections formed with an outer and an inner outwardly directed flange, the outer flange of each rim section merging into and encompassed by a flange of the felly, and a tire element mounted in and extended from each rim section, said tire elements being encompassed by the flanges of the felly and the inner flanges of the rim sections, the said inner flanges being straight and extended beyond the flanges of the felly, the inner portion of the inner side of each of said elements being straight.

PLACID N. CHIASSON.